(12) United States Patent
Graus et al.

(10) Patent No.: US 6,623,631 B1
(45) Date of Patent: Sep. 23, 2003

(54) FILTER ASSEMBLY FOR VACUUM FILTRATION

(75) Inventors: Andreas Graus, Nörten-Hardenberg (DE); Christian Schäfer, Uslar (DE)

(73) Assignee: Sartorius AG, Goettingen (DE)

( * ) Notice: Subject to any disclaimer, the term of this patent is extended or adjusted under 35 U.S.C. 154(b) by 0 days.

(21) Appl. No.: 09/890,333

(22) PCT Filed: Jan. 28, 2000

(86) PCT No.: PCT/EP00/00651

§ 371 (c)(1), (2), (4) Date: Jul. 26, 2001

(87) PCT Pub. No.: WO00/47310

PCT Pub. Date: Aug. 17, 2000

(30) Foreign Application Priority Data

Feb. 11, 1999 (DE) .......................... 199 05 645

(51) Int. Cl.[7] .................. B01D 27/06; B01D 27/08; B01D 27/14; B01D 35/01

(52) U.S. Cl. .............. 210/120; 210/136; 210/304; 210/314; 210/316; 210/317; 210/436; 210/457; 210/472; 210/493.1; 55/327; 55/417; 55/421; 55/482

(58) Field of Search ............. 210/321.72, 321.77, 210/321.78, 321.86, 321.87, 446, 457, 493.1–493.2, 493.5, 497.01–497.2, 120, 136, 314, 316, 317, 435, 472, 512.1, 304, 436; 55/320, 327, 417, 421

(56) References Cited

U.S. PATENT DOCUMENTS

| | | | | |
|---|---|---|---|---|
| 3,854,907 A | * | 12/1974 | Rising | 96/219 |
| 4,038,194 A | * | 7/1977 | Luceyk et al. | 210/436 |
| 4,298,358 A | | 11/1981 | Ruschke | |
| 4,344,777 A | * | 8/1982 | Siposs | 96/206 |
| 4,490,254 A | * | 12/1984 | Gordon et al. | 210/247 |
| RE32,711 E | * | 7/1988 | Dickens et al. | 210/304 |
| 5,468,388 A | | 11/1995 | Goddard et al. | |
| 5,603,900 A | | 2/1997 | Clark et al. | |
| 5,632,894 A | * | 5/1997 | White et al. | 210/436 |

FOREIGN PATENT DOCUMENTS

| WO | WO 9301882 A1 | * | 2/1993 | ........... B01D/61/00 |
|---|---|---|---|---|

* cited by examiner

*Primary Examiner*—Joseph Drodge
*Assistant Examiner*—Marianne Ocampo
(74) *Attorney, Agent, or Firm*—Chernoff, Vilhauer, McClung & Stenzel, LLP

(57) ABSTRACT

There is disclosed a vacuum filtration device for aqueous media that includes a hydrophilic tubular filter element in a cylindrical housing and at least one hydrophobic gas-permeable membrane, coupled with a gas bleed-off valve to allow the escape of air entrained in the filtration medium.

10 Claims, 1 Drawing Sheet

FILTER ASSEMBLY FOR VACUUM FILTRATION

Pursuant to 35 USC §§365(b) and 120, the priority of PCT/EP 00/00651 filed Jan. 28, 2000 and German Application No. DE 199 05 645.5 filed Feb. 11, 1999 is claimed.

BACKGROUND OF THE INVENTION

Filter assemblies for vacuum filtration which are secured fluid-tight to filtrate receptacles are known. One such filter assembly is disclosed in EP 0 595 847 B1, comprising a supported flat filter sealed fluid-tight at its periphery so as to form a feed inlet chamber on the feed side of the filter. On the permeate side of the filter, a filtrate removal device protrudes into a filtrate-retaining chamber. A conduit penetrates the filtrate chamber of the filter assembly, with its distal end connected to a source of vacuum. The flat filter is a hydrophilic, microporous membrane having a plurality of hydrophobic portions. Upon the application of vacuum, the aqueous medium to be filtered flows over but not through the hydrophobic portions and permeates the hydrophilic portions of the membrane and is discharged through a downstream side filtrate discharge port to a filtrate receptacle. Entrained air bubbles, which are carried along with the filtration medium and would otherwise block the hydrophilic part of the membrane for filtration, are supposed to be diverted by the hydrophobic portions of the membrane.

A major drawback of such a filter assembly is that it permits a relatively small flow of filtrate to pass per unit time through the hydrophilic portions of the membrane. The reason for this small flow is that the hydrophilic membrane surface has a relatively small surface area due both to its flat construction and to the inclusion of hydrophobic portions thereon. This arrangement permits air bubbles to attach themselves to the hydrophilic portions of the membrane, causing them to be at least temporarily excluded as a filtering surface for as long as the air bubbles are not in turbulent flow on the hydrophobic portions of the membrane. Moreover, such a hybrid membrane becomes blinded very quickly, so that filter assemblies of this design are not suitable for vacuum filtration of larger quantities of liquid or for liquids carrying substances which deposit as films on membrane filters.

It is therefore a principal object of the invention to provide a vacuum filtration assembly whereby the above-noted disadvantages are overcome.

BRIEF SUMMARY OF THE INVENTION

In accordance with the invention, a vacuum filter assembly is equipped with a cartridge-like filter element enclosed in a cylindrical housing so as to form an inlet chamber with the inlet chamber arranged radially about the filter element and in fluid communication with an upper chamber located axially above the filter element. The filter element comprises at least one tubular, pleated, hydrophilic and microporous membrane filter which is sealed fluid-tight by upper and lower end caps. A filtrate chamber is formed within the tubular membrane filter and is in fluid communication both with an outlet by an opening in the lower end cap, and with a filtrate receptacle which in turn is connected to a vacuum source. The upper end cap also has an opening sealed off by a hydrophobic gas-permeable membrane.

The invention may be employed for clear and sterile filtration of aqueous media, which are typically handled in working volumes of one liter in laboratories and in the technical aspects of biotechnology, chemical operations and medicinal research as well as in other scientific areas in which such filtration may be found necessary.

DETAILED DESCRIPTION OF THE INVENTION

Figure 1:
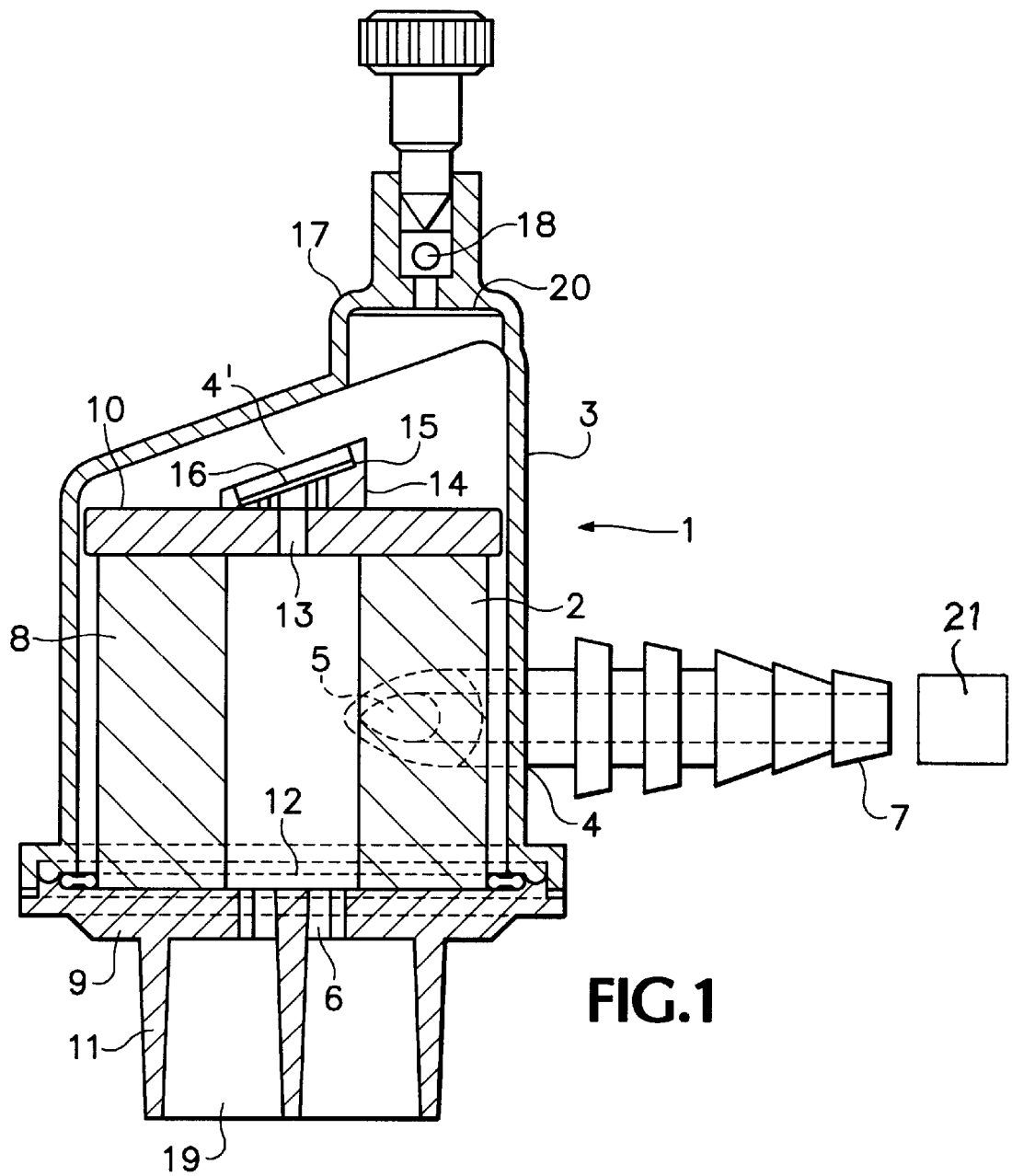
FIG. 1 is a sectional view of an exemplary filtration assembly of the present invention.

There is shown in FIG. 1 a section through an exemplary embodiment of the invention a filter assembly 1 for vacuum filtration of aqueous media, comprising a cartridge-like filter element 2 situated in a cylindrical housing 3 so as to form an inlet chamber 4 radially around filter element 2, inlet chamber 4 being in fluid communication with upper chamber 4' through notches (not shown) around the periphery of upper end cap 10. Housing 3 is equipped with an inlet 5 and an outlet 6.

For filtration, inlet fitting 7 of inlet 5 is connected to a container in which the medium to be filtered is stored. Filter element 2 is comprised of a tubular, pleated, hydrophilic, microporous membrane filter 8, which is sealed fluid-tight at its ends by lower end cap 9 and upper end cap 10. In the embodiment shown, lower end cap 9 also serves as the housing base, which is connected by a connective adapter 11 to a filtrate receptacle (not shown), which in turn is in communication with a vacuum source, which serves as the driving force for the filtration. For this purpose, the filtrate receptacle can be connected to the vacuum source either directly or indirectly by a cross connection (not shown) between filter assembly 1 and the filtrate receptacle which leads to the vacuum source. Central opening 12 of the lower end cap 9 is connected with outlet 6 of housing 3. Upper end cap 10 has a central opening 13 with a fitting 14 and a filter support 15, upon which a first gas-permeable hydrophobic membrane 16 is arranged, sealed fluid-tight at its periphery. Housing 3 is also equipped with a gas bleed fitting 17 on upper chamber 4' which can be closed by gas bleed valve 18.

In order to prevent contamination of the medium to be filtered and to prevent its escape out of gas bleed fitting 17, gas bleed fitting 17 is further separated from inlet chamber 4 and upper chamber 4', from which air is to be removed, by a second hydrophobic, gas-permeable filter 20.

To commence filtration, a vacuum is pulled through connective adaptor 11, outlet 6 and opening 12 of lower end cap 9, causing air to be evacuated from inlet chamber 4 and from upper chamber 4' through hydrophobic membrane 16. Nearly simultaneously the application of vacuum draws the medium to be filtered into and substantially fills inlet chamber 4 and permeates hydrophilic membrane 8 of filter element 2. Any air not escaping by way of upper chamber 4' and gas bleed fitting 17 passes through hydrophobic membrane 16 and is entrained with the filtrate and discharged through the opening 12 of lower end cap 9 into the filtrate receptacle.

By inclusion of gas-permeable hydrophobic membrane 16 onto upper end cap 10, it is possible to vary the surface area of the hydrophobic membrane within a wide range, whereby a rapid removal of the air from the inlet chamber of the filtration assembly can be carried out. An additional advantage is that no air pocket can form in the inlet chamber, which could depress the liquid level of the medium to be filtered below the upper end cap. This arrangement assures that the entire surface area of hydrophilic membrane 8 is covered by the medium to be filtered and so is available for filtration.

With the use of a filter element having a pleated, hydrophilic membrane instead of a flat filter in the filter assembly of the present invention, filtration of large volumes of liquid per unit time becomes possible. By changing the diameter and length of filter element 2, the flux can be tailored to fit a wide variety of filtration applications, being adaptable to accommodate different volumes as well as the type of medium to be filtered. Thus, media which contain particulates which might blind membrane 8, can be filtered by filter assemblies which have a filter element 2 with a large surface area of hydrophilic membrane. Because of the substantial separation between the hydrophilic and hydrophobic membranes, the effective filtration surface area of the hydrophilic membrane is not diminished by the hydrophobic portion, so that the entire hydrophilic membrane surface area of filter element 2 is available for filtration. A preferred surface area for the hydrophobic membrane is in the range of 0.5 to 1.5 cm$^2$.

For particularly large filter batches, hydrophobic membranes approaching the size of the cross-section of the hydrophilic membrane 8 can be installed on upper end cap 10, or a separate filter module with hydrophobic membranes can be installed on upper end cap 10.

In a preferred embodiment of the invention, the hydrophobic gas-permeable membrane 16 is placed at an angle relative to upper end cap 10. The angle thereof is preferably in the range of 0° to 90°, more preferably approximately 20°. Such an angular disposition prevents the build-up of any film from the medium to be filtered on membrane 16, which would otherwise interfere with the removal of the air. If the level of the liquid medium to be filtered drops below the lower surface of upper end cap 10, then the liquid flows away from the inclined membrane 16, so that its surface remains fully available for the passage of air or other entrained gas. Advantageously, the opening for upper end cap 10 is in the form of a fitting 14 and is connected with a filter support 15, upon which membrane 16 is supported.

Preferably, hydrophobic membrane 16 is chosen so that it will only allow the permeation of water at a minimum pressure difference of 1 bar, thus operating as a liquid barrier, thereby ensuring that the entire quantity of the medium to be filtered passes through the hydrophilic membrane 8 of the cartridge-like filter element 2. It is also preferred that hydrophobic membrane 16 has pore sizes in the range of 0.1 to 0.2 μm with low surface tension, particularly if the application requires sterile filtration. Otherwise, microorganisms or cell fragments entrained with the air would pass hydrophobic membrane 16 and contaminate the filtrate. And hydrophobic membrane 16 should also permit so little air flux, that, at the end of the vacuum filtration, upon the emptying of the filter assembly by vacuum, even the last remains of aqueous medium easily passes hydrophilic membrane 8 without leaving any residue.

In a further advantageous embodiment of the invention, cartridge-like filter element 2 is provided with a prefilter 21 to increase its operational life. Such a prefilter would be situated upstream of hydrophilic membrane 8. When this is done, it is preferred the prefilter in a wet state only passes air above a pressure difference of 1 bar. Otherwise air bubbles or an air layer could collect between the prefilter and hydrophilic membrane 8, which would impair the filtration, or, in the case of a renewed startup of the filtration assembly, could even block the filtration.

In an alternative embodiment of the invention, inlet 5 enters inlet chamber 4 tangentially in its lower portion so as to prevent the medium to be filtered from being forced directly into the folds of the pleats of hydrophilic membrane 8 which may on occasion lead to local blockages of the membrane. In such an arrangement the medium flows around filter element 2 in a spiral upward flow pattern, promoting the escape of entrained air bubbles before they reach the surface of hydrophilic membrane 8, which in turn permits them to more quickly pass through hydrophobic membrane 16; any improvement in the removal of air from the medium to be filtered and from the filtration assembly tends to improve filtration capacity.

Housing 3 is preferably equipped with a gas bleed fitting 17 on upper chamber 4' which can be closed by gas bleed valve 18. Upon opening valve 18, filtration can be interrupted quickly and smoothly, accompanied by the least amount of reflex flow of filtrate, and the filtration medium in inlet chamber 4 drains into a collection tank. Gas bleed fittings 17 can also be separated from upper chamber 4' by another hydrophobic, gas-permeable membrane 20, preferably a polytetrafluoroethylene membrane with a pore size in the range of 0.2 to 0.45 μm. This secondary separation of the interior of filter assembly 1 from the external environment is of particular value in the filtration of dangerous or sterile media, as it ensures a sterile seal and prevents the escape of medium and at the same time prevents the infiltration of contaminating microorganisms.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A filter assembly (1) for the vacuum filtration of aqueous media comprising a cartridge filter element (2) arranged in a cylindrical housing (3) to form an inlet chamber (4) radially surrounding said filter element (2), said inlet chamber (4) being in fluid communication with an upper chamber (4') located axially above said filter element (2), said housing (3) being equipped with an inlet (5) and an outlet (6), and said filter element (2) comprising at least one tubular, pleated, hydrophilic, microporous membrane (8) which is sealed fluid-tight in said inlet chamber (4) by a lower end cap (9) and an upper end cap (10), said end caps having central openings (12, 13), wherein said central opening (12) of lower end cap (9) is in fluid communication with said outlet (6) and said central opening (13) of upper end cap (10) is closed by a first hydrophobic gas-permeable membrane (16) that is oriented at an angle of approximately 20° relative to said upper end cap (10).

2. The filter assembly of claim 1 wherein said first hydrophobic membrane (16) is supported.

3. The filter assembly of claim 1 wherein said first hydrophobic membrane (16) permits the permeation of water therethrough only when the transmembrane pressure differential is at least 1 bar.

4. The filter assembly of claim 2, wherein said first hydrophobic membrane (16) has a pore diameter range of from 0.1 to 0.2 μm.

5. The filter assembly of claim 1 wherein said housing (3) is provided with a gas bleed fitting (17) located at the top of said housing (3).

6. The filter assembly of claim 5 wherein said gas bleed fitting (17) is provided with a closeable valve (18).

7. The filter assembly claim 5 wherein said gas bleed fitting (17) is separated from said housing (3) by a second hydrophobic gas-permeable membrane (20).

8. The filter assembly of claim 1 wherein said filter element (2) is provided with a prefilter.

9. The filter assembly of claim 7 wherein said prefilter in a wet state permits the permeation of air therethough only when the pressure differential across said prefilter is at least 1 bar.

10. The filter assembly of claim 1 wherein said inlet (5) is oriented tangentially to said housing (3) in the lower part of said housing (3).

* * * * *